Figure 1:
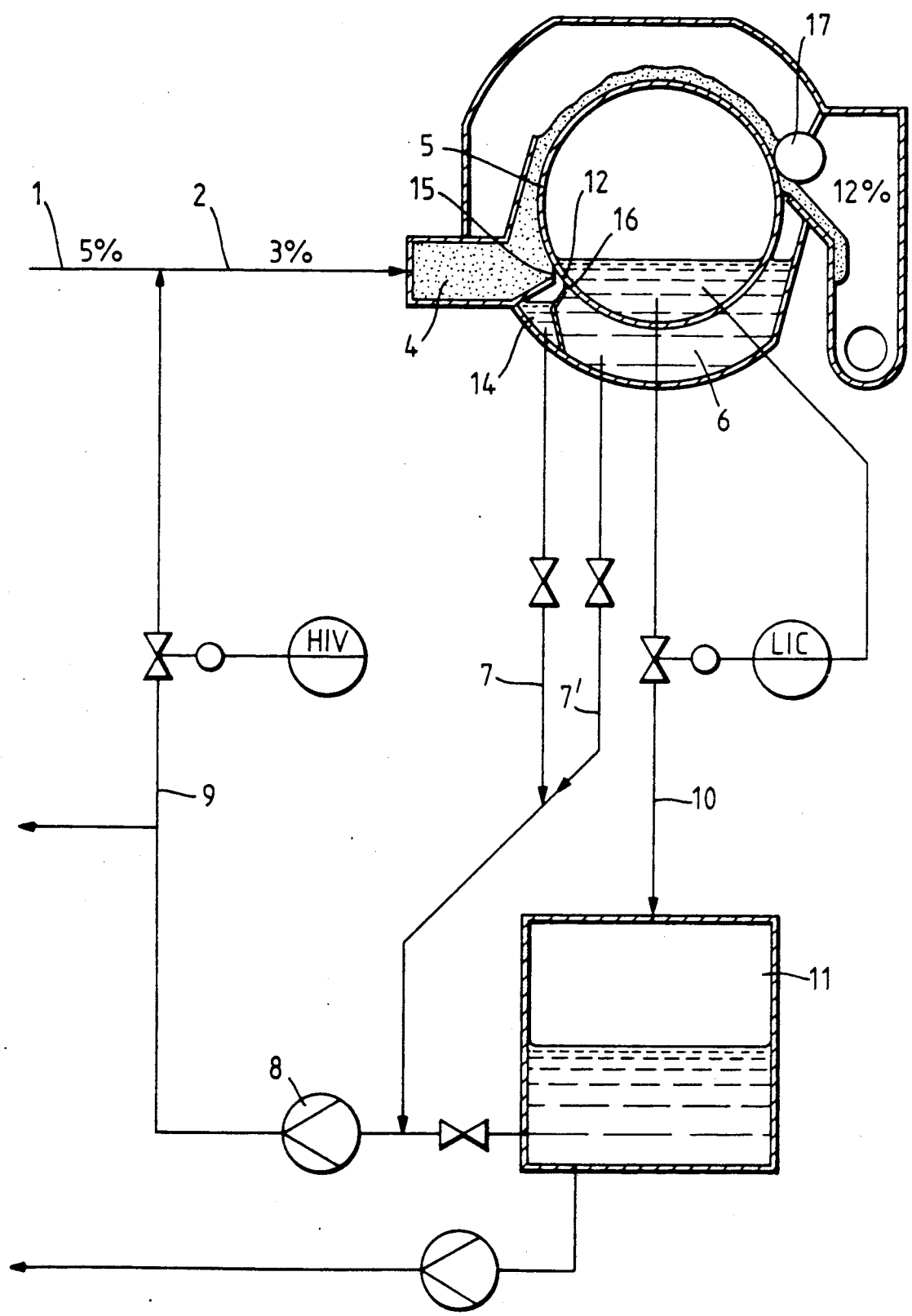

United States Patent [19]

Haapamäki et al.

[11] Patent Number: 5,051,195
[45] Date of Patent: Sep. 24, 1991

[54] METHOD AND EQUIPMENT FOR FILTRATION OF SUSPENSION

[75] Inventors: Pertti Haapamäki, Montreal, Canada; Aaro Ahlgren, Pori, Finland; Lassi Suoninen, Loviisa, Finland; Juho Eriksson, Rauma, Finland

[73] Assignee: Sunds Defibrator Rauma Oy, Pori, Finland

[21] Appl. No.: 421,192

[22] Filed: Oct. 13, 1989

[30] Foreign Application Priority Data

Oct. 13, 1988 [FI] Finland .................................. 884730

[51] Int. Cl.$^5$ ........................................... B01D 33/06
[52] U.S. Cl. ..................................... 210/784; 210/107; 210/247; 210/394; 210/396; 210/404; 210/411; 210/791
[58] Field of Search ................. 162/370, 371; 210/247, 210/394, 396, 424, 403, 784, 107, 404, 411, 791

[56] References Cited

U.S. PATENT DOCUMENTS

| 917,305 | 4/1909 | Johnson | 210/402 |
|---|---|---|---|
| 2,294,179 | 8/1942 | Hawley | 210/396 |
| 2,765,085 | 10/1956 | Strindlund | 210/402 |
| 3,876,548 | 4/1975 | Welles | 210/402 |
| 4,001,119 | 1/1977 | Hunter | 210/404 |
| 4,115,271 | 9/1978 | Holt | 210/247 |
| 4,139,412 | 2/1979 | Printz | 162/371 |
| 4,443,300 | 4/1984 | Bubik et al. | 162/370 |
| 4,844,789 | 7/1989 | Lundqvist | 210/411 |
| 4,894,121 | 1/1990 | Luthi et al. | 210/402 |

FOREIGN PATENT DOCUMENTS

| 1223216 | 6/1987 | Canada | 210/403 |
|---|---|---|---|
| 3706273 | 10/1987 | Fed. Rep. of Germany | 210/402 |
| 26379 | 1/1954 | Finland | 210/403 |
| 146567 | 7/1931 | Switzerland | 210/402 |

Primary Examiner—Robert A. Dawson
Assistant Examiner—Joseph Drodge
Attorney, Agent, or Firm—Burns, Doane, Swecker & Mathis

[57] ABSTRACT

Method and equipment for filtration of a suspension so that the suspension to be filtered is fed from a feed part (4) onto the filter face of a filter member (5), which moves relative the feed part. The pulp layer is formed on the outer face of the filter member and the filtrate flows into the interior of the filter member, and the pulp layer is removed from the filter member at the removing point. After the pulp removing point (17), before the feed point (4), one or several cleaning points (12) are provided wherein liquid is made to flow through the filter member (5) from the inner face of the filter member to the outer face. The flow rate of the liquid that flows through the cleaning point or points is adjusted higher than the rate of any liquid flow that may flow through the rest of the filter member from the inside-face side to the outside-face side.

15 Claims, 2 Drawing Sheets

METHOD AND EQUIPMENT FOR FILTRATION OF SUSPENSION

The present invention concerns a method for filtration of a suspension so that the suspension to be filtered is fed from a feed part onto the filter face of a filter member which moves relative the feed part, whereby a layer of pulp is formed on the outer face of the filter member and the filtrate flows into the interior of the filter member, and the pulp layer is removed from the filter member at the removing point. The invention also concerns an equipment for filtration of suspension, said equipment comprising a basin, a filter member moving in the basin, a feed part for feeding the suspension to be filtered onto the outer face of the filter member, means for removing the pulp web from the filter face, as well as means for removing the filtrate out of the equipment.

For filtration or thickening and for washing of fibrous suspensions, in particular of cellulosic fibrous suspension or pulp slurry, filters are used wherein the fibrous suspension is thickened either onto separate constantly circulating members, such as onto revolving drums, disks, or other filtering members, such as, e.g., onto an endless wire or equivalent.

The fibrous suspension is passed into the feed box, basin, or equivalent of the filter as diluted to a suitable consistency. The fibrous suspension is thickened by filtration by means of a difference in pressure onto a filtering face, which moves in relation to the stationary feed part and carries the thickened suspension further. At present the sealing between the moving filtering member and the edge of the stationary feed part has been solved by using dragging members or a small gap as seals. Dragging members cause abrasion of the filtering member, and a small gap is readily blocked and causes damage to the filtering member. Nor is it possible to make a gap small enough so that no leakage arises. If a resilient, dragging seal is used, a further problem is that all of the pulp that adheres to the face of the filtering member cannot be removed at the removing point, but some of it remains on the filter face as an uneven layer. Thereat, when it reaches the location of the seal during the next revolution, it raises the seal apart from the filtering member. When more pulp is sedimented on the filter face, the friction increases until the pulp layer is wedged between the seal and the filter layer and stops the movement of the filter member.

The object of the present invention is to eliminate the problem mentioned above. The method in accordance with the invention is characterized in that after the pulp removing point, before the feed point, one or several cleaning points are provided wherein liquid is made to flow through the filter member from the inner face of the filter member to the outer face, the flow rate of the liquid that flows through the cleaning point or points being adjusted higher than the rate of any liquid flow that may flow through the rest of the filter member from the inside-face side to the outside-face side. The equipment in accordance with the invention is characterized in that, between the pulp-web removing point and the pulp feed point, the equipment is provided with one or several cleaning points, at which the liquid can be made to flow at the desired rate from the interior of the filter member to outside.

Thus, according to the invention, the problem arising from the pulp that adheres to the face of the drum is eliminated by arranging a filter-member cleaning stage before the filter member arrives at the feed point during its following revolution. According to the invention, a controlled liquid flow is achieved from the space below the liquid level inside the filter member into the separation space outside the filter member, and this flow cleans the filtering face. The solution in accordance with the invention permits such an efficient cleaning that in most cases no separate cleaning of the filter face is needed.

When the invention is employed, the sealing point may be chosen freely at a suitable location.

It is also possible to fit two or more separation spaces one after the other in the direction of running of the filter member. In such a case, the solution in accordance with the invention may also be used for fractioning of the filtrates, e.g., in accordance with air content, fibre content, or concentration of chemicals. From among the separated fractions, it is possible to choose the one that is, in respect of its properties, best suitable for recirculation into the process. On the same basis, it is also possible to choose the fraction to be removed from the process.

Figure 2:
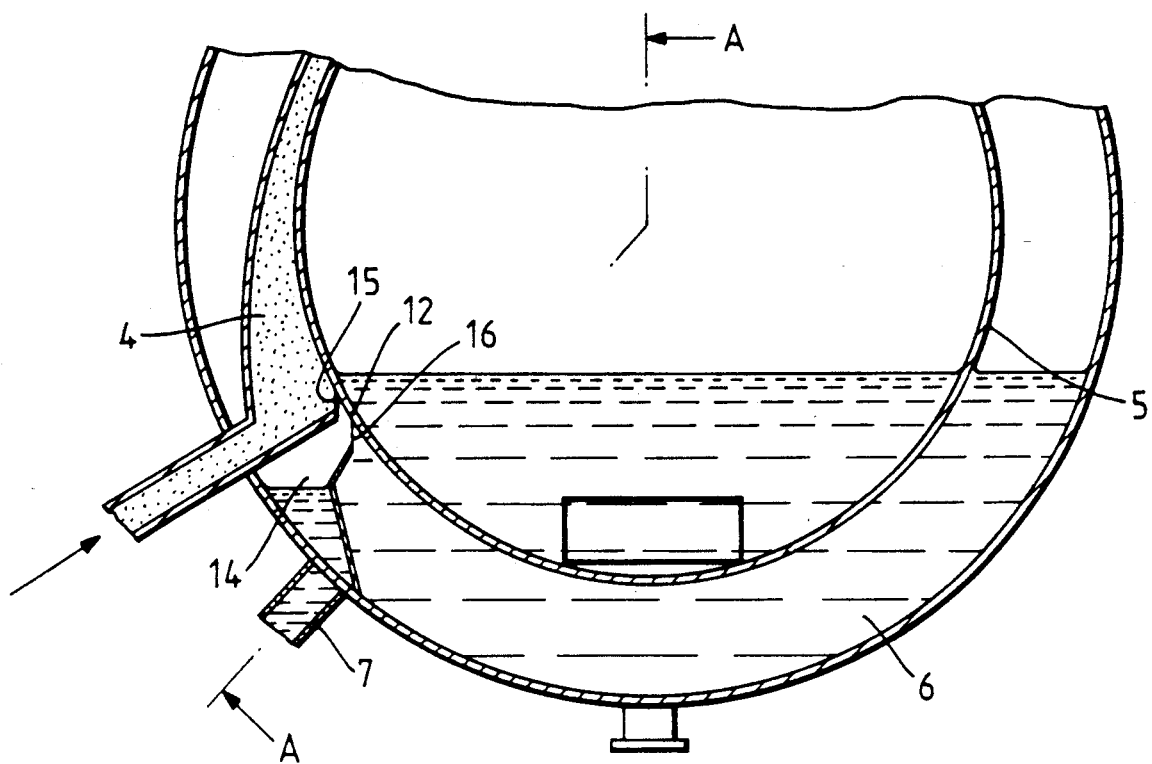
Figure 3:
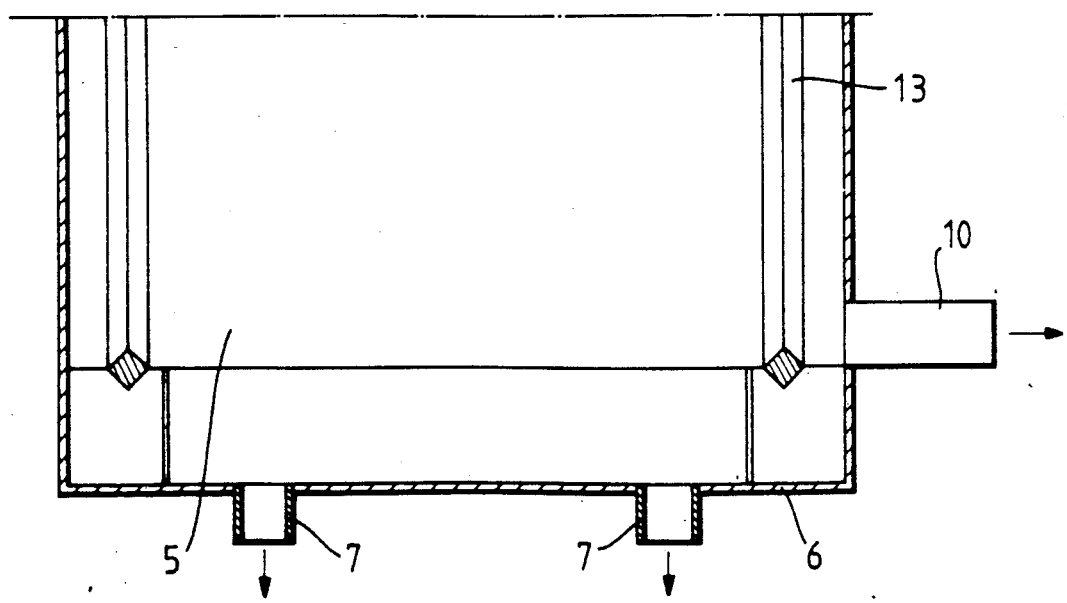

The invention will be described in more detail in the following as applied to a washing drum, reference being made to the accompanying drawings, wherein FIG. 1 illustrates a flow diagram of the connections in the method in accordance with the invention, FIG. 2 is a sectional illustration of principle of the carrying into effect of the method described above in a thickening washer, and FIG. 3 is a sectional view along line A—A in FIG. 2.

According to FIG. 1, the fibrous suspension, e.g. pulp slurry, is passed, e.g., from a buffer tank at a consistency that is higher (e.g., 5%) than the feed consistency of the washing filter (e.g., 3%). The pulp slurry is diluted in the feed pipe system between the points 1 and 2 before the pulp reaches the feed box 4. From the feed box the pulp slurry is pressed by means of the difference in pressure between the inside and the outside of the drum 5 and by means of liquid pressure against the filtering wire-faced drum, whereby the filtrate enters into the drum interior. The pressure prevailing outside the top portion of the drum inside the hood is higher than the pressure in the interior of the drum. On the other hand, the pressure prevailing in the basin 6 outside the bottom portion of the drum is equal to the pressure inside the drum. The direction of rotation of the drum 5 is clockwise in FIGS. 1 and 2. A separation space 14 is provided below the gap between the lower wall of the feed part 4 and the drum 5. The gap between the lower wall of the feed part and the drum is sealed by means of a seal 15, and the gap between the lower wall of the separation space 14 and the drum is sealed by means of a seal 16.

At the cleaning point 12, between the seals 15 and 16, filtrate flows from the interior of the drum into the space 14. From the space 14, filtrate is passed further through the pipe 7, which joins the pipe 7'. The filtrate is passed out of the space 14 rapidly enough so that the liquid level in the space 14 remains below the sealing point 16.

The filtrate present in the basin 6 always contains some extent of fibres that have passed through the filter faces and that, having a weight lower than the weight of the filtrate, attempt to rise, whereby they adhere to the outer face of the drum. The filtrate that flows through the cleaning point 12 from the interior of the drum into the separation space 14 washes these fibres efficiently away from the drum face right before the feed point. At the same time, any leakages that may enter from the high-pressure feed part 4 beyond the seal 15 are also washed into the space 14.

The filtrate that comes from the interior of the drum 5 into the basin 6 and into the space 14 is passed through the pipes 7 and 7' to the suction side of the pump 8 and further through the dilution pipe 9 to dilute the pulp that is being fed in. The filtrate free from fibres is passed along a separate pipe 10 from the interior of the drum 10 into a filtrate tank 11, from which it can also be pumped further to such a process point where a content of fibres in the filtrate is detrimental, e.g. evaporation plant, to the washing jets of the preceding washing filter, or equivalent.

The drum interior and the basin 6 are isolated from each other in a way known in prior art by means of sealing cords 13, the filtrate having access through the wire into the basin, but the fibres not into the drum.

The pulp web gathered on the drum face is removed in a way in itself known at the point 17.

The invention is not confined to the embodiment described above alone, but it may show variation in different ways within the scope of the patent claims. On the circumference of the drum, it is possible to arrange several separation spaces, and the fractions passed into these can be passed further to the desired object, e.g. some fraction be recirculated to the feed box and some fraction be removed completely. The separation spaces may be placed at any location whatsoever on the drum circumference between the pulp removing point and the feed point. However, their effect is most efficient if placed directly before the feed point. To increase the working rate, the separation space 14 may also be divided into parts in the axial direction of the drum, e.g. into four parts. In these it is possible to open or to close areas, e.g., alternatingly or simultaneously by means of a slide or valve device. Nor does the separation space necessarily have to extend across the entire width of the drum, but it may be provided at the points that are considered necessary only, e.g. at the ends of the drum.

The seals between the separation space 14 and the drum may be arranged in different ways. The seal 15 between the feed part 4 and the separation part 14 may also be omitted completely, in which case the leakage arriving from the feed part 4 into the separation space 14 is recirculated, together with the washing flow used for cleaning, back into the feed part.

Above, a drum filter has been described, positive pressure prevailing in the encapsulated space surrounding the drum. The invention may also be applied in connection with a filter member revolving in a basin in an open space, in which case suction is provided inside the filter member by means of negative pressure. It is also suitable in connection with a circulating endless wire filter.

What is claimed is:

1. A method of filtering a suspension using an apparatus having a basin, a filter member rotating relative to said basin, a feed part for feeding said suspension toward said filter member, and a removing part for removing pulp from said filter member, comprising the steps of:
   catching filtrate passing through said filter member and accumulating said filtrate in said basin in a space partially occupied by said filter member;
   dividing said space in a vertically-extending direction into separate portions; and
   independently controlling a level of filtrate in respective said portion and removing filtrate from one of said portions at a rate so as to cause, as a result of said level of filtrate in respective said portions, flow of filtrate across a portion of said filter member adjacent said one portion to clean said portion of said filter member, said one portion of said space thereby forming a cleaning point.

2. An apparatus for filtering a suspension, comprising:
   a rotating filter member;
   a basin for catching filtrate passing through said filter member and accumulating said filtrate in a space partially occupied by said filter member;
   a feed part for feeding said suspension towards said filter member;
   a removing part for removing pulp from said filter member;
   a vertically-extending member dividing said space into separate portions; and
   means for independently controlling a level of filtrate in respective said portions and removing filtrate from one of said portions at a rate so as to cause, as a result of said level of filtrate in respective said portions, flow of filtrate across a portion of said filter member adjacent said one portion to clean said portion of said filter member, said one portion of said space thereby forming a cleaning point.

3. Method as claimed in claim 1, wherein pulp is fed onto the filter member at a point at which the face of the filter member moves upwards, and wherein the cleaning point is arranged underneath the feed part at a point at which the face of the filter member rises upwards from the basin.

4. Method as claimed in claim 3, wherein in said one portion of said space forming the cleaning point, the filtrate level is kept at a lower level than the topmost point of the cleaning point.

5. Equipment as claimed in claim 2, wherein at least one cleaning point is placed underneath the feed part directly before the feed point.

6. Equipment as claimed in claim 2, wherein the cleaning point extends across at least part of the width of the filter member.

7. Equipment as claimed in claim 2, wherein the cleaning point is divided into at least two parts in the direction of width of the filter member.

8. Method as claimed in claim 1, wherein the cleaning point is at least partially sealed relative the remaining space by means of seals fitted against the filter member.

9. Equipment as claimed in claim 5, wherein the cleaning point extends across at least part of the width of the filter member.

10. Equipment as claimed in claim 5, wherein the cleaning point is divided into at least two parts in the direction of the width of the filter member.

11. Equipment as claimed in claim 6, wherein the cleaning point is divided into at least two parts in the direction of the width of the filter member.

12. Equipment as claimed in claim 9, wherein the cleaning point is divided into at least two parts in the direction of the width of the filter member.

13. Equipment as claimed in claim 2, wherein the cleaning point is at least partially sealed relative the remaining space by means of seals fitted against the filter member.

14. Method as claimed in claim 8, wherein said dividing step is accomplished using a separation member to separate filtrate in said one portion of said space forming said cleaning point from the remainder of the filtrate, and comprising the further step of sealing off said separate portions from one another using a seal between said separation member and said filter member.

15. Equipment as claimed in claim 13, wherein said means for dividing comprises a separation member for separation filtrate in said one portion of said space forming said cleaning point from the remainder of the filtrate, and further comprising a seal placed between said separation member and said filter member.

* * * * *